3,311,605
METHOD FOR THE PREPARATION OF POLY-
FUNCTIONAL DIAZONIUM HALIDES
Hartmut Steppan, Wiesbaden-Dotzheim, and Wilhelm
Neugebauer, Wiesbaden-Biebrich, Germany, and August
Rebenstock, deceased, late of Wiesbaden-Biebrich, Germany, by Wilhelmine Rebenstock and Erika Wilhelmine
Unger, heirs, Wiesbaden-Biebrich, Germany, and Else
Rebenstock, nee Gross, Wiesbaden-Biebrich, Germany,
for Albrecht Michael Rebenstock, minor heir, and
Gisela Rebenstock, nee Grief, Wiesbaden, Germany, for
Erika Rebenstock, minor heir, assignors, by mesne assignments, to Azoplate Corporation, Murray Hill, N.J.
No Drawing. Filed Mar. 1, 1965, Ser. No. 440,058
Claims priority, application Germany, Jan. 25, 1961,
K 42,718
1 Claim. (Cl. 260—141)

This application is a continuation-in-part of copending application Ser. No. 124,791, filed July 18, 1961.

This invention relates to new and improved method for the preparation of a polyfunctional diazonium salt which is the product of a condensation, in an inorganic acid condensation medium, of a salt of diphenylamine-4-diazonium or a derivative thereof having a substituent attached to one or both of its phenyl nuclei and formaldehyde. More specifically, the invention refers to a method for making a chloride or a bromide of a polyfunctional diazonium salt of the aforesaid type, and still more specifically, the invention provides for a polyfunctional diazonium chloride or bromide which is essentially free from any accompanying substance, such as salts of metals like sodium, zinc, tin or cadmium chlorides.

It is known to the art to prepare a polyfunctional diazonium salt by condensing, in the presence of a mineral acid, such as sulfuric acid or hydrochloric acid, diphenyl-amine-4-diazonium salt with formaldehyde. In most cases, the condensation had been effected in a sulfuric acid condensation medium, and the condensation products had usually been isolated after converting them into metal halide double salts, diazonium sulfate or diazo sulfonates; isolation of the polyfunctional diazonium compounds in the form of diazo amine compounds is also known.

In accordance with the invention, the method for the preparation of a polyfunctional diazonium halide includes the steps of using phosphoric acid of at least 50% by weight concentration as the condensation medium; modifying the solvency of the liquid portion of the reacted mixture by the addition of methanol; equalizing the sum of halide anions in the reaction mixture to the sum of diazonium salts present therein by the addition of one or more halide substances; neutralizing the reacted mixture by the addition of a neutralizer; separating, after the modifying and equalizing, neutralizing steps, the liquid portion of the reacted mixture from the solid portions thereof; and evaporating the liquid portion to dryness.

In the method according to the invention, the preferred diazonium salts to start with are the chlorides or the bromides, respectively, of diphenylamine-4-diazonium or substituted diphenylamine-4-diazonium, according to the desired halogen component of the corresponding polyfunctional diazonium halide which shall be prepared.

The diazonium salts which may be chosen as one of the starting materials of the method are salts of diphenylamine-4-diazonium and salts of diphenylamine-4-diazonium which carries one substituent or two substituents attached to any one of the two phenyl nuclei.

The second starting material, formaldehyde, is preferably applied in the form of paraformaldehyde, the application of which instead of the application of gaseous or aqueous dissolved formaldehyde is common practice in the chemical art. The amount of formaldehyde or paraformaldehyde applied is preferably 1 mol CHOH for each equivalent $N_2$ group (diazo group). Excess over or deficiency below one mol of formaldehyde may be used, however. Thus, although it is without merit to apply more than two mols of formaldehyde, a higher amount does not mar the method as unreacted formaldehyde is removed at the latest in the last step of this method, i.e. in the evaporation step.

Although the method aims at the production of a halide, it uses phosphoric acid as the condensation medium. The use of phosphoric acid is the expedient of the method which causes that the resulting polyfunctional diazonium halide is more soluble in water than the corresponding condensation product which results when sulfuric acid is used as the condensation medium. The most convenient condensation medium is 85% by weight phosphoric acid, although phosphoric acid of lower concentration is also applicable. In order to have reasonable rates and speeds of condensation, the concentration of the phosphoric acid should be at least 50% by weight. Phosphoric acids of higher concentration with the inclusion of more than 100% phosphoric acids, i.e. 100% by weight phosphoric acid containing phosphorous pentoxide, are likewise applicable.

The condensation is carried out at a temperature interval lying betwen room temperature and slightly elevated temperature, the preferred range being between 35° C. and 65° C.

As diazonium salt starting substances for the method of this invention, examples are the diazotisation products of the following amines:

4-amino-diphenylamine
4-amino-3-methoxy-diphenylamine
4-amino-2'-methoxy-diphenylamine
4-amino-4'-methoxy-diphenylamine
4-amino-3-methyl-diphenylamine
4-amino-3-ethyl-diphenylamine
4-amino-3'-methyl-diphenylamine
4-amino-4'-methyl-diphenylamine
4-amino-3-ethoxy-diphenylamine
4-amino-3-hexoxy-diphenylamine
4-amino-6'-methoxy-3'-methyl-diphenylamine
4-amino-6-methoxy-3-methyl-diphenylamine
4-amino-3,3'-dimethyl-diphenylamine
3-chloro-4'-amino-diphenylamine
4-amino-2,5-diethoxy-diphenylamine
4-amino-4'-n-butoxy-diphenylamine
4-amino-4',3-dimethoxy-diphenylamine The substituent may be any which does not spoil the condensation reaction. Examples of suitable substituents are alkyl groups such as methyl and ethyl, alkoxy groups having not more than six carbon atoms, the carboxy group and the chlorine atom.

The condensation reaction is a relatively slow one. According to the desired degree of condensation, the condensation reaction mixture is allowed to remain, while it is preferably agitated, at the intended condensation temperature for more or less long time. While in some cases one hour may be sufficient for causing the desired degree of condensation, in other cases 24 hours or even a multiple thereof may be necessary. In most cases, however, no further reaction will occur after a condensation time of 20 to 24 hours with the application of a condensation temperature of at least 10° C. If the condensation is, as is preferred, effected in 85% phosphoric acid, at room temperature or slightly elevated temperature, a reaction time of 20 to 24 hours is generally adequate. If the condensation reaction is effected in phosphoric acid of a higher or lower concentration, the reaction temperatures and the times of reaction may vary correspondingly.

In accordance with the invention, the reacted mixture is modified to frustrate its solvency towards undesired components thereof, is also balanced to equalize the sum of halide anions present in the reacted mixture to the sum of diazonium cations present therein, and is further neutralized in order to convert the phosphoric acid used as the condensation medium in metal phosphates which are insoluble in the modified reacted mixture. The equalizing step may be superfluous in cases where the starting diazonium salt is a chloride or bromide.

The solvency of the reacted mixture is modified by the addition of methanol. The minimum amount thereof should be double the weight of the diazonium salt starting substance of the reaction mixture. Higher amounts are more advantageous, the best results have been found when adding a quantity of methanol which amounts to at least six times the weight of the diazonium salt and at most twenty times the weight thereof.

During the condensation reaction, some water is formed and some water may have been introduced into the reaction mixture with the phosphoric acid if the latter is of less than 100% concentration. The total amount of water in the modified reacted mixture shall be not more than the total amount thereof of methanol, measured by weight. Water may be added within the just defined limits.

The neutralization of the reacted mixture is preferably achieved by the addition of hydroxides, carbonates, or bicarbonates of alkali metals or alkaline earth metals, such as sodium or calcium. Other neutralizing additives may be used, such as the corresponding compounds of aluminum or the rare earths. Further, the alcoholates of said metals are effective as a neutralizing agent of the method. As examples, lithium carbonate, strontium hydroxide, barium hydroxide, and didymium carbonate (the latter is a mixture of neodymium and praseodymium carbonate) have been found to be successfully applicable.

Although to start with diazonium halides is preferred in the method of this invention, substituted or un-substituted diphenylamine-4-diazonium salts of other acids, e.g. sulfuric acid or phosphoric acid, may be used as starting materials for the production of polyfunctional diazonium halides. In these latter cases, it is necessary to add chloride ions or bromide ions to the reacted condensation mixture for equalizing the content of said halogen ions to the content of diazonium groups. As halogen equalizing additions, hydrochloric acid, hydrobromic acid or the salts thereof of the metals of the alkaline earth group of the Periodic System, such as calcium, strontium, and barium, are preferably used, if the starting diazonium salt had been a phosphate, whereas barium chloride or barium bromide are the preferred additives where the starting diazonium salt is a sulfate. Generally, any chloride or bromide of an alkaline metal, alkaline earth metal, aluminum or a rare earth may be used as a halide equalizer.

After modification, halogen equalization and neutralization of the reacted mixture, a mixture of a solution of the desired polyfunctional diazonium halide in aqueous methanol and undissolved phosphates of one or more metal salts and occasionally other undissolved metal salt or salts results. According to the method of the invention, the solution is separated from the undissolved salts by known methods, such as filtering, centrifuging, or decantation. After separation from the undissolved salts, the solution of the condensed diazonium halides is evaporated to dryness. Upon evaporation of the solvent, the chlorides or bromides of the condensation product are obtained as solids.

The polyfunctional diazonium halides made according to this invention are free from metal salts. They are a mixture of chemical individuals each of which corresponds to a general formula in which two or more diphenylamine-4-diazonium nuclei are bound together by a methylene bridge, and each diazonium group is bound to one chloride or bromide anion. The products are obtained as brownish-red to greenish-brown solids which, in some cases, are hygroscopic. The products are stable even at tropical temperatures and, thus, can be easily stored and shipped.

The polyfunctional diazonium halides prepared according to this invention are distinguished from the products obtained upon condensation in sulfuric acid, and isolated as a zinc chloride double salt or as a sulfate, as they are very readily soluble in water and also in a number of organic solvents. The compounds are useful as dyestuff intermediates.

The invention will be further illustrated by reference to the following specific examples: In the examples 1 ml. is the unit by volume if 1 gr. is taken as the unit by weight.

*Example 1.*—To 123 parts by weight of 85% phosphoric acid are added, while stirring, 9.6 parts by weight of paraformaldehyde and 67.5 parts by weight of diphenylamine-4-diazonium chloride. After further stirring and keeping at a temperature of 40° C. for 24 hours, the mixture is diluted with 800 parts by volume of methanol and, while still maintaining the temperature at 40° C., 110 to 135 parts by weight of calcium carbonate are added while stirring. As soon as the pH of the mixture is in the range of 6 to 6.5 the mixture is cooled to room temperature. The salts, which have precipitated, are filtered off and the filtrate is evaporated to dryness at a temperature in the range of 40 to 50° C. The yield is 68 parts by weight of the chloride of the condensation product.

*Example 2.*—To 40 parts by volume of 85% phosphoric acid, 3.3 parts by weight of paraformaldehyde and 27.6 parts by weight of diphenylamine-4-diazonium bromide are added, while stirring. After stirring for 24 hours at a temperature of 40° C., the mixture is diluted with 470 parts by volume of methanol and neutralized by the addition of 60 parts by weight of calcium carbonate. The further procedure is as described in Example 1 above. The yield is 22.9 parts by weight of the bromide of the condensation product.

*Example 3.*—To 56.5 parts by weight of 85% phosphoric acid are added, while stirring, 4.4 parts by weight of paraformaldehyde and 39 parts by weight (0.133 mole) of diphenylamine-4-diazonium phosphate. The mixture is stirred for 24 hours at a temperature of 40° C., and then combined with 400 parts by volume of methanol, containing 0.133 mole of hydrobromic acid. The reaction mixture is then heated to a temperature of 40° C., and 65 parts by weight of calcium carbonate are added. As soon as the pH of the mixture is in the range of 6 to 6.5, the mixture is cooled down to room temperature and the inorganic salts which are precipitated are filtered off and the filtrate is completely evaporated at 40° C. to 50° C. under vacuum. The yield is 36.7 parts by weight of the bromide of the condensation product.

When starting with the sulfate of diphenylamine-4-diazonium, instead of with the phosphate, the same result is obtained.

*Example 4.*—66 parts by weight of the condensation mixture described in Example 1 above, as obtained after the stirring for 24 hours at a temperature of 40° C., are dissolved in 200 parts by volume of methanol and, while further stirring, 50 parts by weight of anhydrous sodium carbonate are added. As soon as a pH of 6 to 6.5 is attained, the precipitated salts are filtered off and the filtrate is fully evaporated at a temperature of 40° C., under vacuum. The yield is 21 parts by weight of the chloride of the condensation product.

*Example 5.*—To 4.8 parts by volume of phosphoric acid are added in succession, while stirring, 0.63 part by weight of paraformaldehyde and 5 parts by weight of 3-methoxydiphenylamine-4-diazonium chloride. After stirring for 40 hours at a temperature of 40° C., the condensation mixture is diluted with 55 parts by volume of methanol; 10 parts by weight of calcium carbonate are then added to the solution and the mixture is stirred at a temperature of 40° C., until a pH of approximately 6.5 is attained. The precipitated salts are filtered off and the filtrate is completely evaporated. The yield obtained is 5 parts by weight of the chloride of the condensation product.

Example 6.—To 61.5 parts by weight of 85% phosphoric acid are added, while stirring, 4.8 parts by weight of paraformaldehyde and then 33.8 parts by weight of diphenylamine-4-diazonium chloride. After stirring for 24 hours at a temperature of 40° C., the condensation mixture is diluted with 400 parts by volume of methanol and, while maintaining the temperature at 40° C., 46 parts by weight of calcium hydroxide are gradually added. As soon as a pH of 6 to 6.5 is attained the precipitated salts are filtered off and the filtrate is completely evaporated at a temperature of 40 to 50° C., under vacuum. The yield is 28 parts by weight of the chloride of the condensation product.

Example 7.—At a temperature of 40° C., 4.67 parts by weight of 2-methoxy-diphenylamine-4'diazonium phosphate and 0.465 part by weight of paraformaldehyde are condensed with each other within 26 hours, using 2.76 parts by volume of 85 percent phosphoric acid as the condensation medium. The raw condensate is diluted with 40 parts by volume of methanol, 10 parts by volume of 1.45 molar methanolic hydrobromic acid are added to the mixture, which is then neutralized by the addition of 9 parts by weight of calcium carbonate at a temperature of 50° C. As soon as the solution has attained a pH of 6 to 6.5, the inorganic salts are separated off by means of a suction filter, and the filtrate is then evaporated to complete dryness under vacuum at a temperature not exceeding 50° C. The yield is 4.2 parts by weight of the bromide of the condensation product.

When starting with the sulfate of 2-methoxydiphenylamine-4'-diazonium, instead of with the phosphate, the same result is obtained.

Example 8.—18.7 parts by weight of 4-methoxy-diphenylamine-4'-diazoniumchloride and 2.37 parts by weight of paraformaldehyde are introduced into 19.5 parts by weight of 97 percent phosphoric acid. After a condensation period of 40 hours at 40° C., the mixture is first diluted by adding 150 parts by volume of methanol and 20 parts by volume of water and then neutralized at 40° C. by the addition of 20 parts by weight of calcium carbonate. After the inorganic salts have been removed by suction filtration and the solution has been evaporated to complete dryness under vacuum, 17.2 parts by weight of the chloride of the condensation product are obtained.

Example 9.—372 parts by weight of diphenylamine-4-diazoniumchloride are mixed with 48 parts by weight of paraformaldehyde, and the mixture is then introduced, with stirring, into 517 parts by weight of 85 percent phosphoric acid. The reaction mixture is agitated for 24 hours at a temperature of 40° C.

12.1 parts by weight of the crude reaction mixture thus obtained are dissolved in 60 parts by volume of methanol. Subsequently, 25.2 parts by weight of very finely pulverized potassium bicarbonate are introduced into this solution, with vigorous stirring and at room temperature, until the solution has reached a pH value of 6.5. 40 parts by volume of methanol are added to the solution, and the precipitating salts are drawn off. By evaporating the solution under reduced pressure over a bath of a temperature of 40° C., 4.7 parts by weight of the chloride of the condensation product are obtained in the form of a brown powder.

Example 10.—12.1 parts by weight of the crude condensation product described in Example 9 are dissolved in 50 parts by volume of methanol, and the solution is heated to 40° C. 14.2 parts by weight of magnesium carbonate are introduced in portions into the solution while constantly agitating and adding, at the same time, 40 parts by volume of methanol and 5 parts by volume of water. When a pH of 6.5 has been reached, the salts which precipitated from the solution are drawn off and washed thoroughly with methanol. The filtrate and the methanol used for washing are then evaporated to dryness under reduced pressure and at a temperature of 40° C.

The residue obtained after evaporation consists of 4.6 parts by weight of the chloride of the condensation product in the form of a brown powder.

Example 11.—43.9 parts by weight of diphenylamine-4-diazonium phosphate are thoroughly mixed with 4.95 parts by weight of paraformaldehyde, and the mixture is introduced, with agitation, into 63 parts by weight of 93.4 percent phosphoric acid. The reaction mixture is heated to 40° C. over a period of 24 hours while constantly agitating. 19.5 parts by weight of the crude condensate thus obtained are dissolved in 25 parts by volume of methanol. The solution is mixed with a solution of 2.5 parts by weight of anhydrous strontium bromide in 10 parts by volume of methanol. 50 parts by volume of methanol are added to the mixture and the mixture is stirred for 30 minutes at room temperature. Subsequently, 41.2 parts by weight of strontium carbonate, in portions, and 8.5 parts by volume of water are added to the mixture at 40° C. As soon as a pH value of 6 to 6.5 has been reached by the addition of the strontium carbonate, the precipitated salts are drawn off and the filtrate is completely evaporated under reduced pressure and at a temperature of 40° C. The residue obtained after evaporation consists of 3.8 parts by weight of the bromide of the condensation product.

When starting with the sulfate of diphenylamine-4-diazonium instead of with the phosphate, the same result is obtained.

Example 12.—14.9 parts by weight of the crude condensate described in Example 11 are dissolved in 25 parts by volume of methanol. To this solution, a solution is added which consists of 1.5 parts by weight of calcium chloride (dihydrate) in 10 parts by volume of methanol. Then 50 parts by volume of methanol are added to the reaction mixture and it is agitated for 30 minutes at room temperature. The reaction mixture is then heated to 40° C. and neutralized by adding 8.5 parts by volume of water with 69 parts by weight of barium carbonate, which are introduced in portions until a pH value of 6 to 6.5 has been reached. The precipitated salts are drawn off and the filtrate is completely evaporated. The residue obtained after evaporation is dissolved again in a little methanol, the solution is filtered, and the filtrate obtained is again completely evaporated. After evaporation, a residue is obtained which consists of 3.3 parts by weight of the chloride of the condensation product in the form of a solid substance.

When starting with the sulfate of diphenylamine-4-diazonium instead of with the phosphate, the same result is obtained.

Example 13.—3 parts by weight of the crude condensate described in Example 9 are dissolved in 13 parts by volume of methanol, and the solution is neutralized at 40° C., by adding 2.6 parts by volume of water and 14.2 parts by weight of lanthanum carbonate, the latter being introduced in portions. The precipitating salts are drawn off, washed thoroughly with methanol, and the filtrate and the methanol used for washing are evaporated at 40° C. under reduced pressure. The residue is dissolved in a small quantity of methanol, again filtered, and evaporated. The residue obtained after evaporation consists of 0.9 part by weight of the chloride of the condensation product.

Example 14.—12.1 parts by weight of the crude condensate described in Example 9 are dissolved in 50 parts by volume of methanol. While agitating and at room temperature, 2-molar methanolic potash lye is added until a pH value of 6.5 has been reached. The quantity required is 35 parts by volume. The mixture is then cooled to 0° C. The precipitated salts are then drawn off, and the filtrate is completely evaporated at 40° C. The residue obtained after evaporation is again dissolved in a small quantity of methanol, the solution is cooled to 0° C., and the cold solution is again filtered. The filtrate obtained is again completely evaporated. The residue obtained after evaporation consists of 3.9 parts by weight of the chloride of the condensation product.

*Example 15.*—30 parts by weight of commercial barium oxide are dissolved in 150 parts by volume of methanol and the solution is heated for 1½ hours to the boiling point, with reflux. The solution of the barium alcoholate thus obtained is drawn off from the undissolved residue (4.7 grams) and used as follows:

12.1 parts by weight of the crude condensate described in Example 9 are dissolved in 50 parts by volume of methanol. At a temperature of 40° C. and while agitating, the barium alcoholate solution mentioned above is introduced dropwise into this solution, until a pH value of 6 to 6.5 has been reached. After adding some methanol (in order to make the mixture less viscous), the precipitated salts are drawn off and thoroughly washed with methanol. The chloride of the condensation product (3.3 parts by weight) is isolated as described in Example 14.

*Example 16.*—67.5 parts by weight of diphenylamine-4-diazonium chloride are dissolved in 250 parts by weight of 85 percent phosphoric acid with agitation. 24 parts by weight of a 40 percent aqueous solution of formaldehyde are added dropwise, with agitation, and the mixture is condensed for 24 hours at 40° C. The crude condensate is then diluted with 1600 parts by volume of methanol, treated with 220–280 parts by weight of $CaCO_3$ at 40° C. and further processed as described in Example 1. The reaction product obtained is equivalent in quantity and qualities to the reaction product obtained according to Example 1.

As mentioned above, the chlorides prepared in accordance with the invention are more easily soluble in water. For instance, of the product prepared in accordance with the above Example 1, at least two times the quantity by weight is soluble in water of room temperature than of a polyfunctional diazonium chloride which had been prepared in a similar manner with the exception, however, that 78 percent by weight sulfuric acid had been used as the condensation medium instead of 85 percent by weight phosphoric acid.

It will be obvious to those skilled in the art that many modifications may be made within the scope of the present invention without departing from the spirit thereof, and the invention includes all such modifications.

What is claimed is:

A process for the preparation of a polyfunctional diazonium halide which comprises condensing formaldehyde with a diazonium salt selected from the group consisting of the sulfates, chlorides, bromides and phosphates of diphenylamine-4-diazonium and diphenylamine-4-diazonium substituted on a phenyl nucleus by not more than two substituents selected from the group consisting of methyl and ethyl, alkoxy groups having not more than six carbon atoms, a carboxy group, and chloro, in solution in phosphoric acid of at least 50% concentration by weight; modifying the solvency of a liquid portion of the reaction mixture by the addition of an effective amount of methanol; equalizing the sum of halide ions in the reaction mixture to the sum of diazonium cations present therein by the addition of at least one halide substance selected from the group consisting of hydrochloric and hydrobromic acids and the chlorides and bromides of alkali metals, alkaline earth metals, aluminum, and rare earth metals; neutralizing the reaction mixture by the addition of a compound selected from the group consisting of the oxides, hydroxides, carbonates, bicarbonates, and alcoholates of the alkali metals, alkaline earth metals, aluminum and rare earth metals; separating the liquid portion of the reaction mixture from a solid portion thereof; and evaporating the liquid portion to dryness to recover the polyfunctional diazonium salt as a residue of the evaporation.

References Cited by the Examiner

UNITED STATES PATENTS

| | | | |
|---|---|---|---|
| 2,063,631 | 12/1936 | Schmidt et al. | 260—141 |
| 2,679,498 | 4/1954 | Seven et al. | 260—141 |
| 3,163,633 | 12/1964 | Steppan et al. | 260—141 |

CHARLES B. PARKER, *Primary Examiner.*

D. M. PAPUGA, *Assistant Examiner.*